United States Patent [19]

Burroughs

[11] Patent Number: 5,102,543

[45] Date of Patent: Apr. 7, 1992

[54] IMPROVED ROTATABLE SPOOL VALVE FOR USE WITH FILTER CARTRIDGES

[75] Inventor: Andrew C. Burroughs, Stoughton, Wis.

[73] Assignee: Sta-Rite Industries, Inc., Milwaukee, Wis.

[21] Appl. No.: 548,661

[22] Filed: Jun. 25, 1990

[51] Int. Cl.⁵ .............................................. B01D 27/00
[52] U.S. Cl. ................................. 210/282; 137/625.23; 137/625.47; 210/424
[58] Field of Search ..................... 137/625.22, 625.23, 137/625.29, 625.32, 625.47, 625.16, 625.19; 210/282, 424, 130, 133, 420; 251/309, 310, 209

[56] References Cited

U.S. PATENT DOCUMENTS

| | | | |
|---|---|---|---|
| 86,158 | 1/1869 | Houston | 210/130 |
| 1,062,236 | 5/1913 | Hitchcock | 210/130 |
| 1,181,387 | 5/1916 | Joerin, Jr. et al. | 210/130 |
| 1,478,125 | 12/1923 | Kear | 137/625.21 |
| 2,178,240 | 10/1939 | Pascale | 183/112 |
| 2,227,302 | 12/1940 | Edstrom | 15/14 |
| 2,256,279 | 9/1941 | Farmer et al. | 183/39 |
| 3,048,191 | 8/1962 | Crang | 137/625.32 |
| 3,080,977 | 3/1963 | Jones | 210/232 |
| 3,306,451 | 2/1967 | Kudlaty | 210/135 |
| 3,746,171 | 7/1973 | Thomsen | 210/234 |
| 3,852,196 | 12/1974 | Szpur | 210/133 |
| 3,853,761 | 12/1974 | McClory | 210/100 |
| 3,907,688 | 9/1975 | Close | 210/424 |
| 3,926,815 | 12/1975 | McClory | 210/424 |
| 3,935,106 | 1/1976 | Lipner | 210/232 |
| 3,940,222 | 2/1976 | Zink | 425/199 |
| 4,011,662 | 3/1977 | Davis et al. | 34/90 |
| 4,059,422 | 11/1977 | Steiner | 55/418 |
| 4,082,664 | 4/1978 | Lindstol | 210/80 |
| 4,082,673 | 4/1978 | Cilento | 210/234 |
| 4,187,882 | 2/1980 | Watson | 137/625.47 |
| 4,271,020 | 6/1981 | Van Meter | 210/133 Q |
| 4,299,696 | 11/1981 | Rosaen et al. | 210/130 |
| 4,465,167 | 8/1984 | Fujioka | 137/625.23 |
| 4,504,389 | 3/1985 | Rundzaitis | 210/266 |
| 4,529,515 | 7/1985 | Selz | 210/234 |
| 4,592,389 | 6/1986 | Yamada et al. | 137/625.22 |
| 4,654,142 | 3/1987 | Thomsen et al. | 210/232 |
| 4,658,859 | 4/1987 | Backe et al. | 137/625.22 |
| 4,702,269 | 10/1987 | Schuler | 137/246.2 |
| 4,731,183 | 3/1988 | Schumacher, II | 210/419 |
| 4,841,595 | 6/1989 | Wiese | 15/352 |
| 4,901,763 | 2/1990 | Scott | 137/625.47 |
| 4,982,760 | 1/1991 | Mustaklem | 137/625.47 |

FOREIGN PATENT DOCUMENTS

| | | | |
|---|---|---|---|
| 410680 | 3/1926 | Fed. Rep. of Germany | 137/625.22 |
| 1109656 | 1/1956 | France | 137/625.22 |
| 1215700 | 12/1967 | United Kingdom | 137/625.47 |

Primary Examiner—Robert A. Dawson
Assistant Examiner—Joseph Drodge
Attorney, Agent, or Firm—Jansson & Shupe, Ltd.

[57] ABSTRACT

The improved valve apparatus is particularly useful in connection with fluid filtering using a cartridge. The apparatus includes a valve body with inlet and outlet ports and a rotatable spool mounted in the body. The spool has an angularly affixed seal member which directs fluid flow. When the spool is in one position, fluid is directed along a flow path which includes the inlet port, the cartridge and the outlet port. When the spool is in the other position, fluid is directed along another flow path which includes the ports but which bypasses the cartridge. In that way, the cartridge can be replaced without interrupting continuity of flow.

18 Claims, 4 Drawing Sheets

IMPROVED ROTATABLE SPOOL VALVE FOR USE WITH FILTER CARTRIDGES

FIELD OF THE INVENTION

This invention is related generally to valves for controlling the flow of fluid and, more particularly, to two position valves which are used to control the flow of a fluid along a first path or a second path.

BACKGROUND OF THE INVENTION

Valves and valve assemblies are commonly used to control the flow of a fluid. One application for such valves is in fluid filtration wherein the fluid flows through a valve body and the filtering medium is a replaceable cartridge-type filter. Such filters may be used to remove particulates from the gas or liquid flowing through them. In other applications, such filters are used to remove droplets of water, oil or other contaminants from a stream of gas which flows through the filter.

Various types of valve assemblies for use on filtering applications are shown in U.S. Pat. Nos. 3,777,889; 4,092,673 and 4,731,183. The valve assemblies shown therein have a valve body with an attached canister or housing and are used to control the flow of fluid through a replaceable cartridge filter housed in the canister. Such known assemblies have a common disadvantage in that they require that fluid flow be entirely shut off when the filter is being replaced. In many filtration applications, residential and commercial water systems for example, it is usually considered more desirable to have unfiltered water available than to have the water supply interrupted, even for a relatively short period of time.

Similar types of valve assemblies are shown in U.S. Pat. Nos. 3,306,451; 3,853,761; 3,907,688; 3,935,106 and 4,271,020. The valves shown in these latter patents provide the additional capability of maintaining the continuity of fluid flow, even during those occasions when the filter cartridge is being changed. Such valves are often said to have a "bypass" capability in that in one position, fluid flow bypasses the chamber in which the filter is housed The cartridge can be easily changed without interruption of service and, equally important, without serious leakage or spillage of fluid to the surrounding area.

However, many of the valves shown in the foregoing patents share a common disadvantage in that they rely for their flow directing and fluid sealing capabilities upon parts which have large sealing areas and make sliding contact with one another. Such parts must necessarily be closely and accurately fitted to provide an adequate fluid seal since their sealing surfaces are not resilient. That is, because of the rigidity of the parts and of the necessity to effect a good seal, there is relatively little "forgiveness" in their manufacturing tolerances.

In addition, the valves shown in all of the foregoing patents require a substantial number of parts to construct them. This has adverse implications for the purchasing and inventory control functions and for the time required to assemble such valves. Thus, their final cost is necessarily adversely impacted.

Yet another disadvantage of the valve assemblies shown in certain of the foregoing patents relates to the fact that they are devoid of any pressure venting capability. Such capability is important since fluid flowing through the assembly is under pressure. When the cartridge filter is to be changed, pressure in the canister makes it difficult to unscrew or otherwise release the canister from the valve body unless pressure is first relieved.

A valve assembly which has both filtration and bypass capabilities, which incorporates parts readily constructed by plastic injection molding techniques, which uses resilient seal techniques to provide fluid sealing, which incorporates a pressure vent and which requires a minimum number of parts would be an important advance in the art.

OBJECTS OF THE INVENTION

It is an object of this invention to provide a valve which overcomes some of the problems and shortcomings of the prior art.

Another object of this invention is to provide a valve which uses resilient seal techniques for fluid sealing.

Yet another object of this invention is to provide a valve which minimizes the number of parts incorporated therein.

Another object of this invention is to provide a valve having parts which may be easily made using plastic injection molding techniques.

Still another object of this invention is to provide a two position valve wherein the fluid flowing therethrough may be filtered or bypassed.

Another object of this invention is to provide a valve having a pressure vent.

These and other important objects will be apparent from the descriptions of this invention which follow.

SUMMARY OF THE INVENTION

A valve for controlling a flow of a fluid includes a valve body having a first sealing area and a second sealing area The body also has a first flow path and a second flow path, the first path being oriented along a first axis. A valve spool is mounted in the body and arranged for rotational movement about a second axis which is non-parallel to the first axis. In a highly preferred embodiment, the first axis and the second axis are at a 45° angle to one another.

A seal member is angularly affixed to the spool and is in sealing engagement with the first sealing area when the spool is in the first position and with the second sealing area when the spool is in the second position. In the first position, fluid is directed along the first flow path and in the second position, fluid is directed along the second flow path. Such arrangement permits fluid flowing through the body to bypass an attached cartridge-type filter while the filter is being replaced or otherwise serviced.

In a highly preferred embodiment, the valve body has inlet and outlet ports which are concentric along a first axis. A cavity is formed in the valve body and has its long axis oriented at about a 45° angle to the axis defined by the ports. The body also includes a first seal area and a second seal area which are oriented at a 90° angle to one another. Depending upon the position of the valve spool, one of these seal areas is contacted by the seal member which is affixed to and moves with the spool.

The valve spool has an elongate body of reduced thickness and a pair of enlarged bearing areas spaced from one another to support the spool for rotational movement within the body cavity. The seal member is affixed to the spool at a position intermediate the bearing areas. Preferably, the seal member is oriented at about a 45° angle to the longitudinal axis of the spool body. This unique arrangement and the relative locations of the first and second sealing areas causes fluid to flow along the first path (for bypassing fluid around the filter) or along the second path (for filtering the fluid) as the valve spool is rotated 180° between its first position and its second position.

Irrespective of whether the spool is in the filtering or bypass position, the spool defines a portion of the resulting flow path. When the spool is in the first bypassing position, fluid is permitted to flow in substantially a straight line through the annular region defined by the cavity wall and the spool body. That is, when the spool is in the bypass position, fluid flows unimpeded through the valve. The sump which contains the cartridge filter can then be readily removed for changing the filter or for cleaning it while yet maintaining the continuity of fluid flow.

When the valve spool is in the second position, fluid flows through an aperture formed in its distal end. The seal member provides a barrier which prevents fluid from flowing directly to the outlet port and which also prevents filtered fluid from intermingling with incoming, unfiltered fluid. Fluid is directed to the interior chamber of the attached sump which contains the filter. From this chamber, fluid flows radially inward through the filter, thence through a central filter passage and then through an outlet passage in the valve body. From the outlet passage, flow is through the space defined by the cavity wall and the spool body and thence to the outlet port.

When the spool is in the bypass position, pressurized fluid trapped in the sump chamber can impair or prevent the removal of the filter sump unless provisions are made to relieve the pressure. Therefore, in a highly preferred embodiment, the valve spool has an interior longitudinal channel which is in fluid communication with the chamber containing the filter. A pressure vent valve is mounted on the proximal end of the spool and is manually opened by depressing a thumb button. Depressing such button will release a small quantity of trapped gas or liquid, thereby permitting the pressure in the chamber to be reduced to atmospheric pressure. The sump may then be easily removed for filter access.

DETAILED DESCRIPTIONS OF PREFERRED EMBODIMENTS

The figures show an improved valve 10 in accordance with the invention.

Figure 1:
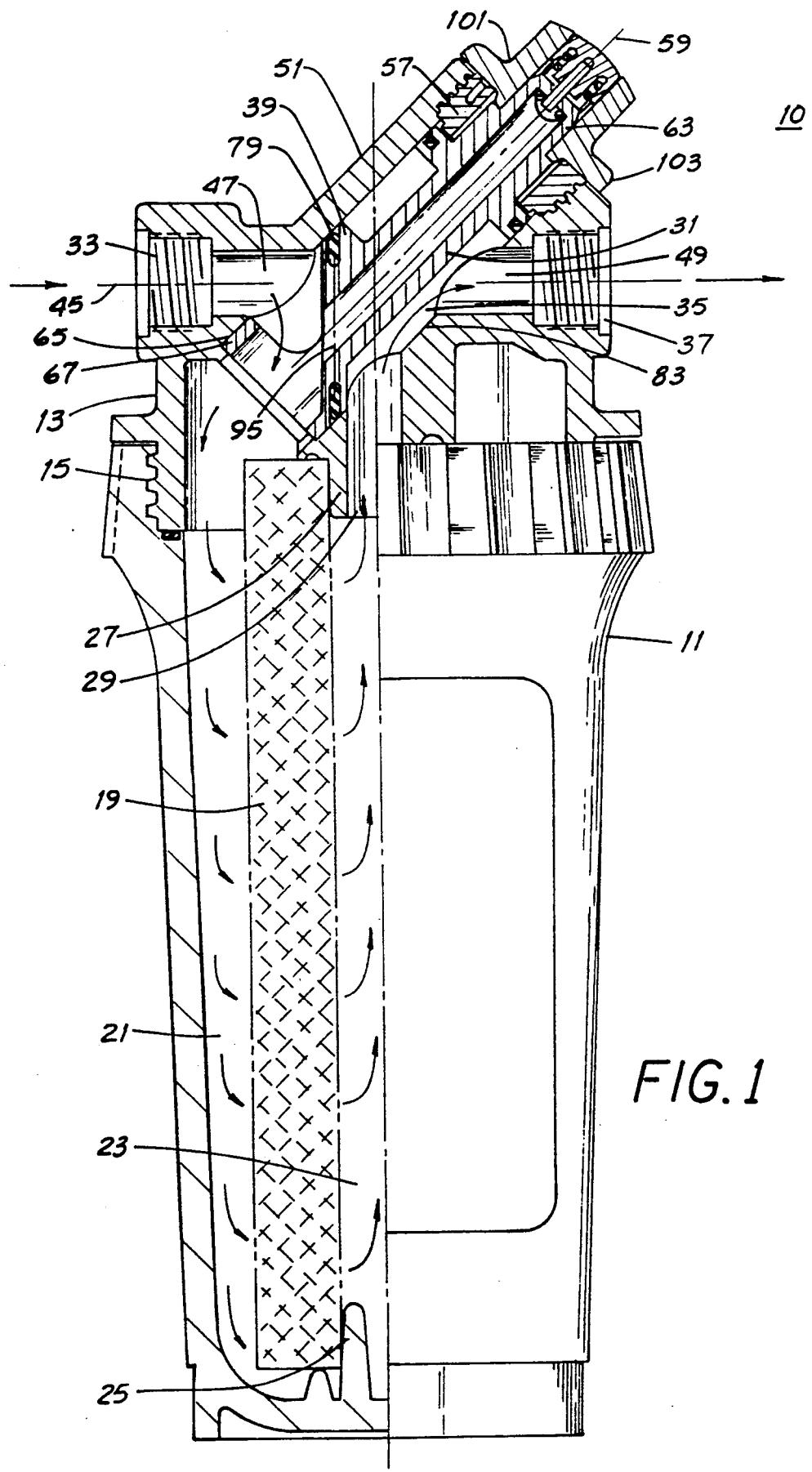
FIG. 1 is a side elevation view, partly in cross section, showing the valve in conjunction with an attached sump and a cartridge filter mounted therewithin and shown in dotted outline, such valve being in the second or filtering position.
Figure 2:
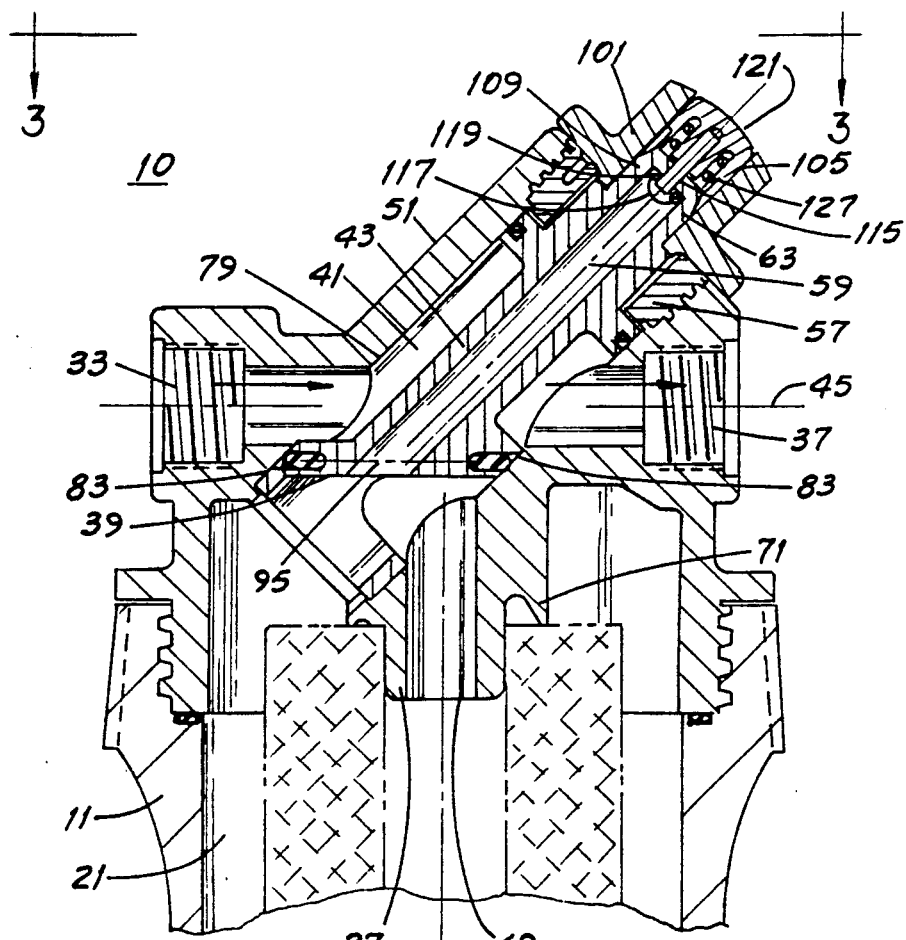
FIG. 2 is a side elevation view, in cross section, of the valve of FIG. 1 shown in conjunction with an attached sump (partly broken away) and a cartridge filter shown in dotted outline, such valve being in the first or bypassing position.

Referring first to FIGS. 1 and 2, the valve 10 is shown in connection with a downwardly depending, generally cylindrical hollow sump 11 which is removably attached to the valve body 13 by threads 15. A cylindrical cartridge filter 19 is confined within the sump chamber 21, such filter 19 having a longitudinal central flow passage 23 therethrough. At its lower end, the sump 11 includes an upwardly projecting stem 25 while the body 13 includes a similar, downwardly projecting stem 27 having a passage 29 formed therein. These stems 25, 27 engage the passage 23 at either end for centrally supporting the filter 19 within the sump 11.

When the valve spool 31 is in the position shown in FIG. 1, fluid is directed from the inlet port 33 downward through the spool 31 and into the chamber 21. This fluid flows radially inward through the outer surface of the filter 19 and emerges in the longitudinal passage 23. From the passage 23, it flows upward through the passage 29 in the stem 27, through a space 35 defined by the spool 31 and the valve body 13 and thence to the outlet port 37. Impurities are thereby removed from the stream of fluid flowing through the filter 19.

When the valve spool 31 is in the position shown in FIG. 2, fluid is prevented by the seal member 39 from flowing downward into the chamber 21. Instead, fluid flows from the inlet port 33, through the annular region 41 defined by the valve body 13 and the spool body 43 and thence to the outlet port 37. The sump 11 can therefore be removed for filter service while yet maintaining continuity of flow.

Figure 3:
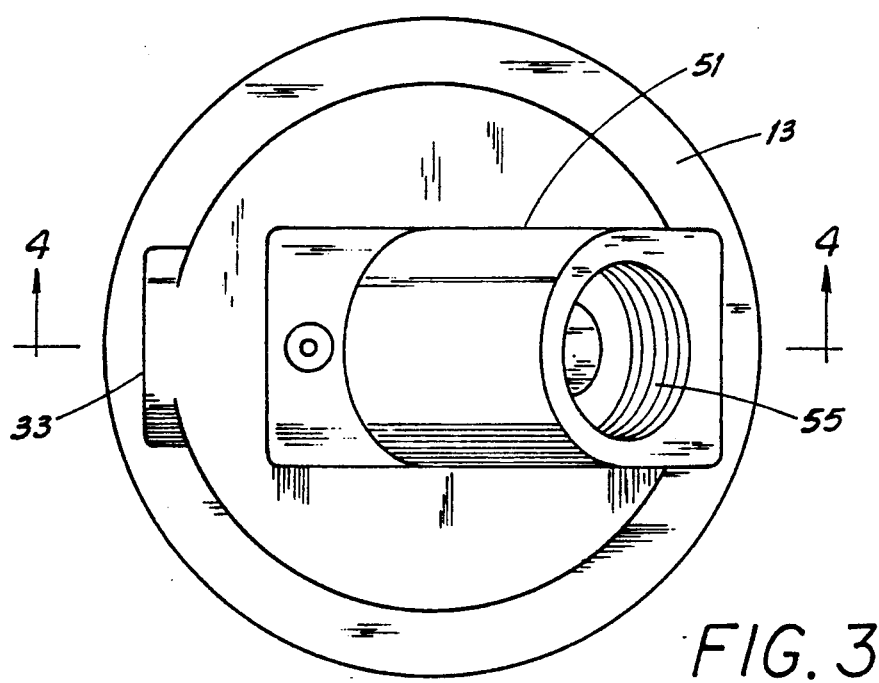
FIG. 3 is a top plan view of the valve body shown in FIG. 2 and taken along the viewing plane 3—3 thereof.
Figure 4:
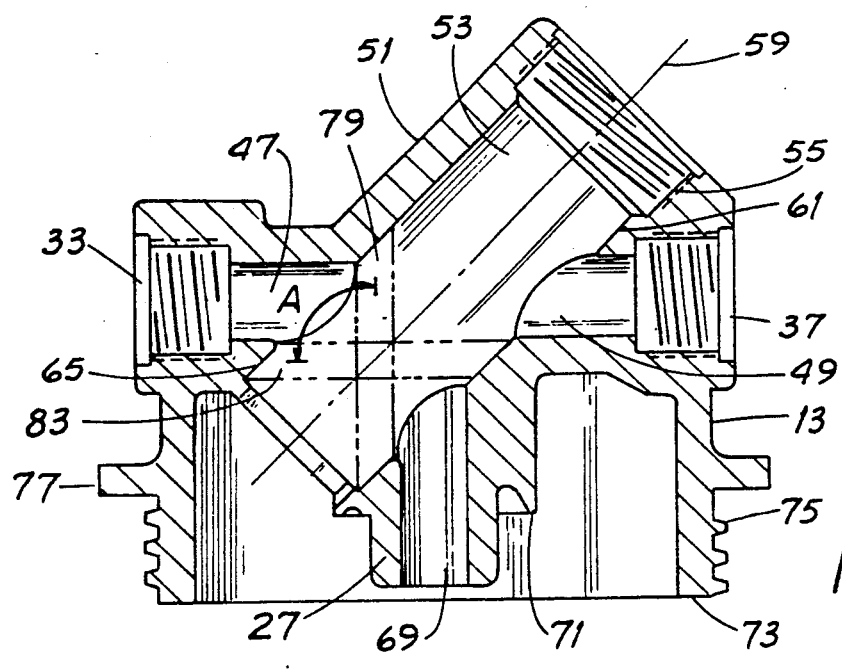
FIG. 4 is a cross sectional side elevation view of the valve body shown in FIG. 3, taken along the viewing plane 4—4 thereof.

Referring additionally to FIGS. 3 and 4, the valve body 13 includes a first inlet port 33 and a second outlet port 37 which are generally concentric along a first axis 45. An inlet passage 47 and an outlet passage 49 are connected to the ports 33 and 37, respectively. An angularly oriented spool housing 51 is formed in the body 13 and defines a cavity 53 for receiving the spool 31 as described in greater detail below. The housing 51 has an enlarged threaded area 55 at its upper end for receiving a threaded collar 57 which helps retain the spool 31 in a position generally concentric with the second axis 59. That portion of the interior surface of the housing 51 which is immediately below and adjacent the threaded area 55 defines a first, upper bearing area 61 which supports the spool 31 for rotation near its proximal end 63. At its lower end, the housing 51 includes a second bearing area 65 which similarly supports the distal end 67 of the spool 31 for rotation.

A centrally located, downwardly projecting stem 27 is sized to engage and supportively fit into the filter passage 23 and includes the interior flow passage 69. An enlarged shoulder 71 bears against the top of the filter 19 when it is installed in the sump 11 and provides a further supporting and locating function. The body 13 also includes a downwardly extending, generally cylindrical skirt 73 having exterior threads 75 formed thereon for attachment of the sump 11. An outwardly projecting shoulder 77 enhances appearance and helps prevent dirt from entering the threads 75.

Figure 4A:
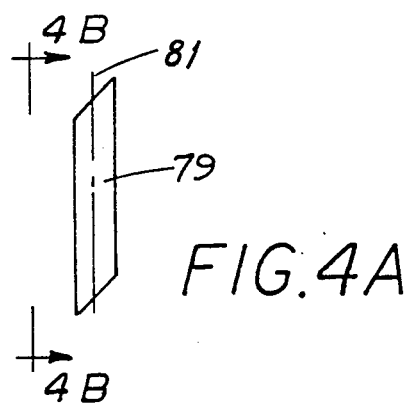
FIG. 4A is a spatial view of the first sealing area taken in the perspective of FIG. 4.
Figure 4B:
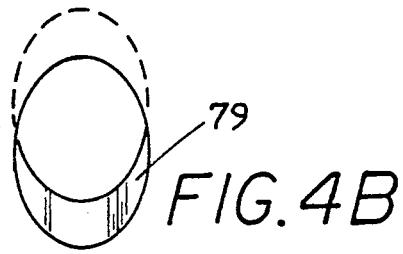
FIG. 4B is a spatial view of the first sealing area taken along the viewing axis 4B of FIG. 4A.

When the valve spool 31 and its attached seal member 39 are in one of the positions shown in FIG. 1 and FIG. 2, provision must be made for the seal member 39 to contact and seal against the body 13 for directing fluid along one of two flow paths. Accordingly, the body 13 includes a generally vertically oriented second sealing area 79 which is contacted by the seal member 39 when the spool is in the second position as shown in FIG. 1. If "removed" from the body 13 and viewed spatially in the perspective of FIG. 4, the second sealing area 79 would appear as shown in FIG. 4A and generally defines a second plane 81. If viewed spatially along axis 4B, the sealing area 79 would have an elliptical appearance as shown in FIG. 4B. It will also be appreciated that the second sealing area 79 defines a circle when viewed along the second axis 59.

Figure 4C:
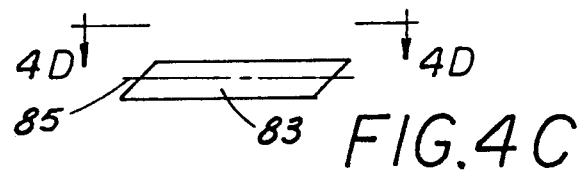
FIG. 4C is a spatial view of the second sealing area taken in the perspective of FIG. 4.
Figure 4D:
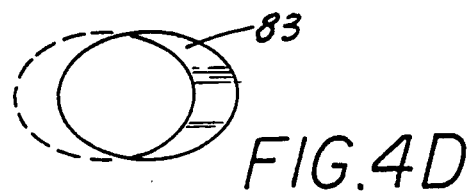
FIG. 4D is a spatial view of the second sealing area taken along the viewing axis 4D of FIG. 4C.

Similarly, the body 13 also includes a generally horizontally oriented first sealing area 83 which is contacted by the seal member 39 when the spool is in the first position as shown in FIG. 2. If "removed" from the body 13 and viewed spatially in the perspective of FIG. 4, the first sealing area 83 would appear as shown in FIG. 4C and generally defines a first plane 85. If viewed spatially along axis 4D, the sealing area 83 would have an elliptical appearance as shown in FIG. 4D. Like the second sealing area 79, the second sealing area defines a circle when viewed along the first axis 59. The smaller angle "A" defined by the second plane 81 and the first plane 85 is at least 45° and in a highly preferred embodiment, such angle is about 90°.

Referring additionally to FIGS. 4, 5, 5A, 6 and 7, the valve spool 31 includes an elongate spool body 43 of reduced thickness and an enlarged upper bearing shoulder 87 located near the proximal end 63 of the spool 31 and having a resilient seal 91a. An enlarged bearing shoulder 89 is also located at the distal end 67 of the spool 31 and these shoulders 87, 89 engage the areas 61 and 65, respectively, when the spool 31 is received in the body cavity 53.

Figure 5:
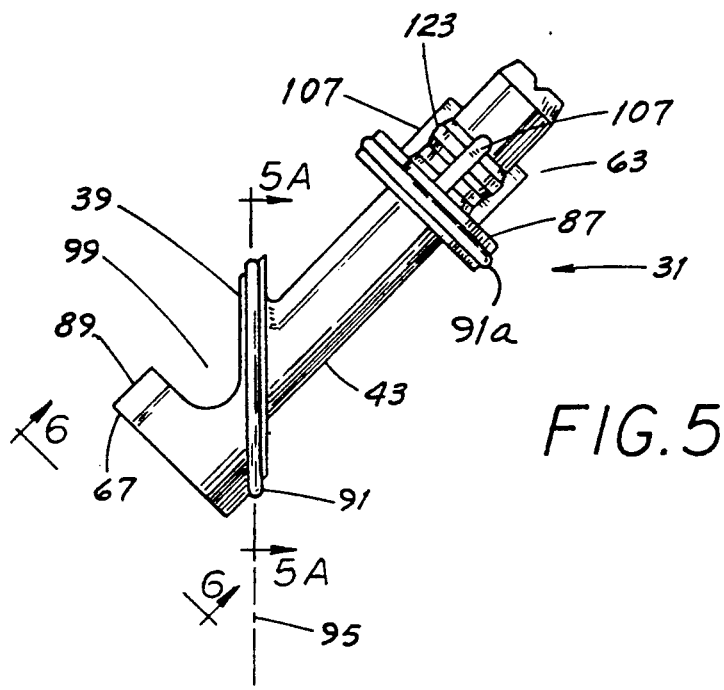
FIG. 5 is a side elevation view, in full representation, of the valve spool shown in conjunction with resilient seals installed thereon.
Figure 7:
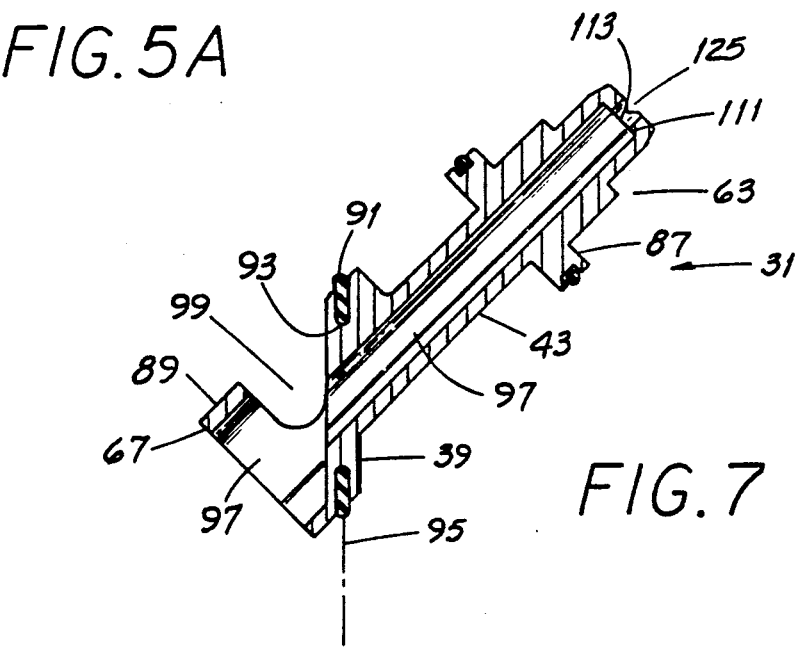
FIG. 7 is a cross sectional side elevation view of the spool of FIG. 5, taken along the viewing plane 7—7 of FIG. 6.

A seal member 39 is angularly affixed to the spool 31 and has a groove 93 about its periphery which receives a resilient seal 91 The outer perimeter of this seal 91 generally defines a perimeter plane 95, the edge of which seen in FIGS. 5 and 7. As best seen in FIGS. 1 and 2, when the spool 31 is installed in the body 13 and is in the first or second position, the perimeter plane 95 intersects the second axis 59 at an angle which is greater than 0° and less than 90°. In a highly preferred embodiment, this angle is about 45°.

Figures 5A, 6:
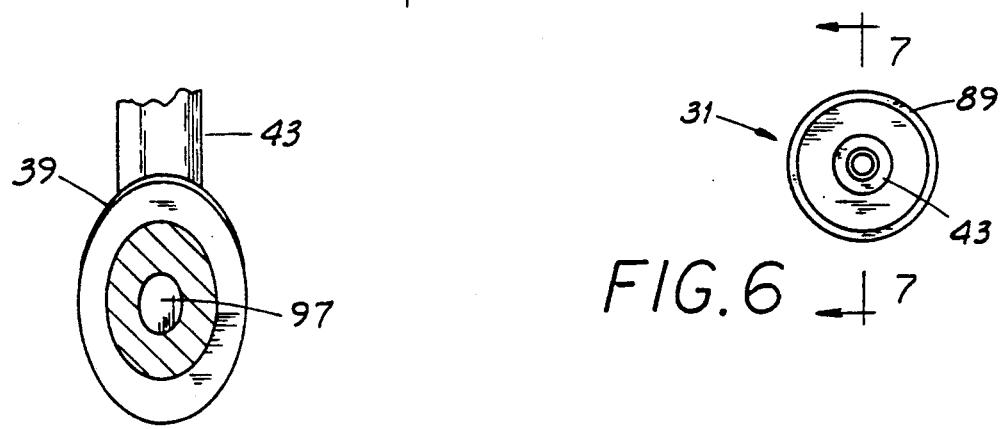
FIG. 5A is a view of the spool taken along the viewing plane 5A—5A of FIG. 5 with the resilient seal omitted.
FIG. 6 is an end elevation view of the valve spool shown in FIG. 5, taken along the viewing plane 6—6 thereof.

Referring particularly to FIGS. 5A and 7, the spool 31 has a concentric interior passage 97 which communicates between the proximal end 63 and the distal end 67. In the region of the body 43, this passage 97 has a reduced diameter but at the distal end 67, it is greatly enlarged. An aperture 99 is formed in the wall of the valve spool 31 at a location intermediate the seal member 39 and the lower bearing shoulder 89. As explained above and in greater detail below, fluid flows through this aperture 99 and out the passage 97 at the distal end 67 when the spool 31 is in the second or filtering position.

Referring next to FIGS. 2, 5 and 7, the valve spool 31 is rotatably positioned by a handle 101 attached to its proximal end 63. Such handle 101 has a projecting rim 103, the underside of which is adjacent the housing 51 and the collar 57. An interior opening 105 has longitudinally arranged slots (not shown) which engage ribs 107 in the spool 31 for permitting rotational spool movement.

The valve 10 also includes a vent valve 109 for relieving pressure in the chamber 21 in preparation for changing or servicing the filter 19. As shown in FIGS. 2 and 7, a shoulder 111 at the proximal end 63 of the spool 31 defines a hole 113 which is in fluid communication with the passage 97 and which receives the stem 115 of the valve 109 with slight clearance. The valve 109 is embodied as a self-tapping screw which has an enlarged head 117 and an annular resilient seal 119 located between the head 117 and the shoulder 111. Pressure in the chamber 21 and the passage 97 urges the valve 109 upward to the position shown in FIG. 2. When the valve 109 is in such position, the seal 119 is compressed by the head 117 against the shoulder 111 and prevents the escape of fluid through the passage 97 and hole 113.

A vent button 121 is movably received in the opening 105, is partially retained on the spool 31 by spring-like stakes which spread apart when the button 121 is depressed and urge it upward when the bottom 121 is released Depression of the button 121 moves the valve 109 downward and the resulting clearance between the seal 119 and the shoulder 111 permits pressurized fluid to be vented to a groove 125 in the proximal end 63 of the spool 31 and thence to the exterior. A compression spring 127 is deployed between the button 121 and the shoulder 111 to additionally urge the seal 119 into contact with the shoulder 111.

In operation and assuming that a new filter 19 is installed within the sump 11, the sump 11 is secured to the valve body 13 and the valve spool 31 is rotated until the seal member 39 is in the second position and in sealing engagement with the second seal area 79. Such position is shown in FIG. 1. Fluid from the inlet port 33 flows through the inlet passage 47, downward through the aperture 99, out the distal end 67 of the spool 31 to the chamber 21, radially inward through the filter 19 and upward through the central passage 23. From there it flows through the passage 69 in the stem 27, through the space 35, along the outlet passage 49 and exits the outlet port 37.

When the filter 19 becomes sufficiently dirty to require changing or cleaning, the valve spool 31 is rotated until the seal member 39 is in the first position and in sealing engagement with the first seal area 83. Such position is shown in FIG. 2 Fluid is thereby caused to flow along the inlet passage 47, through the annular region 41 defined by the spool body 13 and the wall of the cavity 53 and thence to the outlet passage 49 and the outlet port 37. The filter 19 is thereby bypassed while yet maintaining continuity of fluid flow.

The button 121 is then depressed to open the vent valve 109 and relieve the pressure in the chamber 21. The sump 11 may thereupon be readily removed from the body 31. When servicing of the filter 19 is complete, the valve spool 31 is returned to the second position by rotating the handle 101.

Several observations can now be made. One is that when the spool 31 and seal member 39 are moved between the two sealing positions in the illustrated embodiment, the plane 95 defined by the seal member 39 experiences a 90° position change as the valve spool 31 is rotated 180°. That is, the angular excursion of the valve spool 31 is about twice the change in position experienced by the seal member 39.

Further, in the highly preferred embodiment described above, the cross sectional areas of the flow paths through the body 13 are maximized for reduced pressure drop However, the configuration of the valve 10 may be varied by modifying the various angular relationships of the parts. For example, the housing 51 may be oriented in the body 13 in such a way that the smaller included angle between the first axis 45 and the second axis 59 is less than 45°. In such instance, the smaller angle defined by the first plane 81 and the second plane 85 would be less than 90° and a value of at least 45° is probably the minimum acceptable.

As another example, the seal member 39 may be oriented with respect to the second axis 59 of the spool 31 such that the perimeter plane 95 intersects the second axis 59 at an angle which is greater than 0° and less than 90°, an angle of 45° being preferred.

While the principles of this invention have been described in connection with specific embodiments, it should be understood clearly that these descriptions are made only by way of example and are not intended to limit the scope of the invention.

What is claimed is:

1. In a fluid filtering assembly having a valve spool body, an inlet port, an outlet port, a sump and a cartridge means for filtering fluid flowing through the assembly, the improvement comprising:
   the body having first and second seal areas;
   first and second flow paths, each including the inlet port and the outlet port;
   valve spool rotatably mounted in a cavity in the body, having an angularly affixed plate-like seal member and movable between a first position and a second position;
   in the first position, the seal member being in sealing engagement against the first seal area and directing fluid flow along the first flow path bypassing the cartridge;
   in the second position, the seal member being in sealing engagement against the second seal area and directing fluid flow along the second flow path through the cartridge;
   thereby permitting replacement of the cartridge while maintaining continuity of fluid flow through the ports.

2. The filtering assembly of claim 1 wherein the valve spool is rotatable through an angle that changes the angular orientation of the seal member relative to the body and wherein the angle of spool rotation is about twice the angular change in position of the seal member.

3. The filtering assembly of claim 2 wherein the angle of spool rotation is about 180°.

4. The filtering assembly of claim 1 wherein the flow paths are generally aligned along a first axis and the seal member has a sealing perimeter defining a perimeter plane generally parallel to the first axis when the seal member is in the first position.

5. The filtering assembly of claim 4 wherein the perimeter plane is generally normal tot he first axis when the seal member is in the second position.

6. A valve for controlling flow of a fluid including:
   a valve body having first and second sealing areas, a first flow path oriented along a first axis and a second flow path, the flow paths having common inlet and outlet ports;
   a valve spool mounted in the body for rotational movement about a second axis non-parallel to the first axis and movable without a required disassembly of the spool from the body between a first position directing fluid along the first path and a second position directing fluid along the second path;
   a seal member affixed at an acute angle to the spool and having a sealing perimeter generally defining a plane, such seal member being in sealing engagement with the first sealing area when the spool is in the first position and in sealing engagement with the second sealing area when the spool is in the second position;
   fluid flow being maintained through the ports, irrespective of spool position.

7. The valve of claim 6 wherein the plane intersects the second axis which is greater than 0 degrees and less than 90 degrees.

8. The valve of claim 7 wherein the plane intersects the second axis at an angle of about 45 degrees.

9. A valve for controlling flow of a fluid including:
   a valve body having first and second sealing areas, a first flow path oriented along a first axis and a second flow path;
   a valve spool mounted in the body for rotational movement about a second axis at an acute angle to the first axis and movable between a first position directing fluid along the first path and a second position directing fluid along the second path, the spool including an elongate spool body of relatively reduced thickness and a pair of bearing areas of relatively increased thickness and spaced from one another for supporting the spool for rotational movement;
   a seal member angularly affixed to the spool at a position intermediate the baring areas and in sealing engagement with the first sealing area when the spool is in the first position and with the second sealing area when the spool is in the second position;
   fluid thereby being directed along the first path when the spool is in the first position and along the second path when the spool is in the second position.

10. The valve of claim 9 wherein the first sealing area and the second sealing area generally define a first plane and a second plane, respectively, said planes intersecting at an acute angle and a complementary obtuse angle and wherein the acute angle is at least 45 degrees.

11. The valve of claim 9 wherein the first sealing area and the second sealing area generally define a first plane and a second plane, respectively, said planes intersecting at an angle of about 90 degrees.

12. The valve of claim 9 wherein the rotational movement of the valve spool is about 180 degrees as the spool is moved between the first position and the second position.

13. A valve adapted for use in an assembly having a fluid filter cartridge, the valve including:
   a valve body having first and second sealing areas, a first flow path generally oriented along a first axis defining a flow path bypassing the filter cartridge and a second flow path for flowing fluid through the filter cartridge;

an elongate valve spool supported in the body and adapted for rotational movement between a first position and a second position and about a second axis intersecting the first axis;

a resilient seal member angularly affixed to he spool and having a perimeter generally defining a circle as viewed along the second axis;

the seal member being in contact with the first sealing area when the valve spool is in the first position and in contact with the second sealing area when the valve spool is in the second position;

fluid thereby bypassing the filter when the spool is in the first position and flowing through he filter when the spool is in the second position.

14. The valve of claim 13 wherein the valve body includes a cavity having a cavity wall, wherein the valve spool is received in the cavity and includes a pair of bearing area of increased thickness and an elongate spool body of reduced thickness, wherein the spool body and the cavity wall define a passage and wherein fluid flows through said passage when the spool is in the first position, thereby permitting uninterrupted fluid flow while the filter is being changed.

15. The valve of claim 14 wherein:

one of the bearing areas is a lower bearing area;

the valve spool has a distal end, is generally hollow and is supported for rotation by the lower bearing area located adjacent its distal end;

the valve spool includes an aperture located intermediate the seal member and the lower bearing area; and, fluid flows through the aperture and the distal end when the spool is in the second position.

16. The valve of claim 15 wherein:

the spool is rotatable through an angular excursion;

the first sealing area and the second sealing area generally define a first plane and second plane, respectively; and, the included angle defined by the intersection of the first plane and the second plane is about one-half the angular excursion of the spool when rotated between the first position and the second position.

17. The valve of claim 16 wherein the included angle between the first axis and the second axis is about 45 degrees.

18. The valve of claim 17 wherein the angular excursion of the valve spool is about 180 degrees when rotated between the first position and the second position.

* * * * *

UNITED STATES PATENT AND TRADEMARK OFFICE
CERTIFICATE OF CORRECTION

PATENT NO. : 5,102,543

DATED : April 7, 1992

INVENTOR(S) : Andrew C. Burroughs

It is certified that error appears in the above-identified patent and that said Letters Patent is hereby corrected as shown below:

In column 1, line 44, after "housed" insert --.--.

In column 2, line 37, after "area" insert --.--.

In column 3, line 49, delete "conJunction" and insert --conjunction--.

In column 5, line 37, delete "second" (2nd occur) and insert --first--.

In column 5, line 38, delete "first" and insert --second--.

In column 5, line 53, after "91" insert --.--.

In column 6, line 32, after "released" insert --.--.

In column 6, line 57, after "2" insert --.--.

UNITED STATES PATENT AND TRADEMARK OFFICE
CERTIFICATE OF CORRECTION

PATENT NO. : 5,102,543

DATED : April, 1992

INVENTOR(S) : Andrew C. Burroughs

It is certified that error appears in the above-identified patent and that said Letters Patent is hereby corrected as shown below:

In column 7, line 12, after "drop" insert --.--

Col.7, In claim 1, line 39, before "valve" insert --a--.

In claim 5, line 66, delete "tot he" and insert --to the--.

Col.8, In claim 9, line 41, delete "baring" and insert --bearing--.

Col.9, In claim 13, line 5, delete "he" and insert --the--.

In claim 13, line 14, delete "he" and insert --the--.

In claim 14, line 19, delete "area" and insert --areas--.

Signed and Sealed this

First Day of June, 1993

Attest:

MICHAEL K. KIRK

Attesting Officer

Acting Commissioner of Patents and Trademarks